W. D. SEAL.
MEANS FOR PROPELLING CARRIAGES.
APPLICATION FILED DEC. 6, 1910.
986,227.
Patented Mar. 7, 1911.
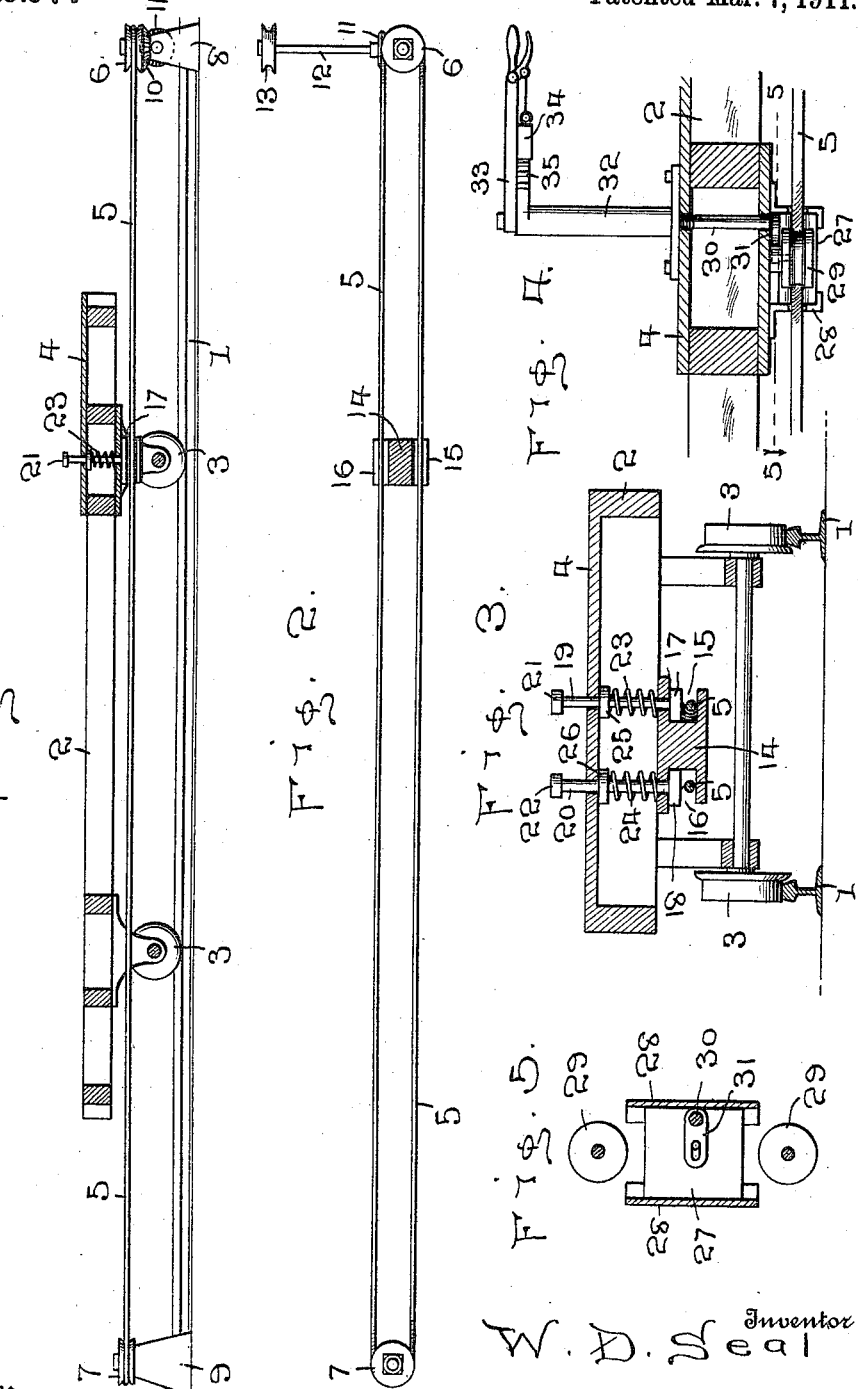
Inventor
W. D. Seal
By W. J. Fitzgerald
Attorneys
Witnesses

UNITED STATES PATENT OFFICE.

WILLIAM D. SEAL, OF DES ARC, MISSOURI.

MEANS FOR PROPELLING CARRIAGES.

986,227.  Specification of Letters Patent.  Patented Mar. 7, 1911.

Application filed December 6, 1910. Serial No. 595,923.

*To all whom it may concern:*

Be it known that I, WILLIAM D. SEAL, a citizen of the United States, residing at Des Arc, in the county of Iron and State of Missouri, have invented certain new and useful Improvements in Means for Propelling Carriages; and I do hereby declare the following to be a full, clear, and exact description of the invention, such as will enable others skilled in the art to which it appertains to make and use the same.

My invention relates to new and useful improvements in means for propelling carriages and more particularly to that class used in connection with saw mills and my object is to provide an endless cable and means for moving the same lengthwise.

A further object is to provide grips upon the frame of the carriage adapted to engage one or the other of the sections of the cable to move the carriage in opposite directions, and, a further object is to provide means for operating said grips and place the same in position to be controlled by the operator upon the carriage.

Other objects and advantages will be hereinafter set forth and pointed out in the specification.

In the accompanying drawings, which are made a part of this application, Figure 1 is a longitudinal sectional view through the carriage, showing the cable in position to operate the same. Fig. 2 is a plan view of the cable showing a portion of the grip mechanism in section. Fig. 3 is a transverse sectional view through the carriage and gripping mechanism. Fig. 4 is a vertical sectional view showing means for operating the gripping mechanism by hand, and, Fig. 5 is a sectional view thereof as seen on line 5—5, Fig. 4.

Referring to the drawings in which similar reference numerals designate corresponding parts throughout the several views, 1 indicates track rails upon which is adapted to travel the usual or any preferred form of carriage 2 used for transporting logs to a saw, said carriage being mounted upon wheels 3.

At one end of the carriage 2 is a platform 4, upon which the operator is adapted to stand while the carriage is being shifted back and forth to move the log toward or from the saw.

In order to cause the carriage to travel back and forth an endless cable 5 is extended below the carriage and around drums 6 and 7, said drums being mounted on standards 8 and 9, respectively, at a suitable distance from each end of the carriage. The drum 6 is provided with a gear 10, with which meshes a gear 11 carried by a shaft 12, said shaft having a belt wheel 13 at one end thereof, by means of which power is applied to rotate the shaft and drive the drum 6 to move the cable 5 lengthwise.

In order to cause the carriage to travel with the cable, a block 14 is secured to the under face of the carriage, said block having recesses 15 and 16 therein to receive the parallel portions of the cable, the cable, when the carriage is not in use, moving freely through said recesses.

To cause the carriage to travel with the cable, grip blocks 17 and 18 are positioned in the recesses, and above the parallel portions of the cable, said grip blocks being carried by plungers 19 and 20, respectively, which project upwardly through the platform and are provided with tread plates 21 and 22 at their upper ends.

When the operator desires to move the carriage forwardly or toward the saw he places his foot on the tread plate 21 and directs pressure thereon, which lowers the grip block 17 into engagement with that section of the cable passing through the recess 15 and so long as pressure is applied to the tread plate 21 the carriage will travel forwardly with the cable. Should it be desired, however, to move the carriage in the opposite direction, the pressure is applied to the tread plate 22, which will move the grip block 18 into engagement with that section of the cable seated in the recess 16 and as said section of the cable is traveling in the opposite direction from that in the recess 15, the carriage will be moved rearwardly. The plungers and grip blocks carried thereby are normally held in their elevated positions by placing springs 23 and 24 around the plungers and between the block 14 and collars 25 and 26 carried by the plungers. By this construction it will be readily seen that it will require but one operator to control the movement of the carriage and arrange the usual form of stop blocks on the carriage, as while the operator is using his hands for controlling the usual form of levers (not shown) he can use his feet for controlling the movement of the carriage toward or from the saw. It will likewise be seen that the gripping device can be instantly applied or released and the carriage moved to any desired distance in either direction, and, it will likewise be seen that this device can be readily installed and used in connection with any form of saw mill carriage.

Instead of operating the gripping mechanism by the pressure of the foot, a hand mechanism may be provided, in which instance a block 27 is slidably mounted in a guide 28 below the carriage 2, the ends of the block engaging the sections of the cable 5 to move the same into engagement with groove rollers 29, also carried by the carriage 2, said rollers being stationary. The block 27 is operated by extending a shaft 30 perpendicularly to the carriage 2 and through the platform 4, the lower end of the shaft 30 having a crank arm 31 thereon, which engages the block 27 and moves the same longitudinally when the shaft is rotated. The upper end of the shaft 30 extends through a sleeve 32 and is provided at its upper end with a lever 33, by means of which the shaft is rotated in either direction.

In order to hold the lever in its shifted position, said lever is provided with the usual or any preferred form of latch 34, which coöperates with the rack 35, fixed to the upper end of the sleeve. In operating this form of device the lever is swung in one direction to engage the section of the cable to cause the carriage to travel forwardly, the swinging movement of the lever forcing the block into engagement with the cable and binding the cable between the block and one of the rollers and by swinging the lever in the opposite direction the proper distance, the opposite section of the cable will be engaged to move the carriage in the opposite direction.

It will be understood, of course, that the block 27 is of such length as to not engage either section of the cable when the carriage is at rest.

What I claim is:

1. The combination with a movable carriage, of an endless cable, means to operate the cable to move the same lengthwise, gripping means carried by the movable carriage and adapted to coöperate with the parallel sections of the cable and manually operated means projecting upwardly through the platform of the carriage to move the gripping mechanism into engagement with either of the sections of the cable to propel the carriage in either direction.

2. The combination with a movable carriage, of an endless cable, means to operate the cable to move the same lengthwise, a block carried by the carriage having recesses in its edges to receive the parallel sections of the cable, grip blocks in said recesses adapted to engage the sections of the cable, means to move the grip blocks into engagement with the cable under pressure and additional means to release the grip blocks from the cable.

3. The combination with a movable carriage, of an endless cable, drums beyond the ends of the carriage to receive the cable, a gear on one of the drums, means to rotate said gear and drum to move the cable lengthwise, a block carried by the carriage and having recesses in its edges to receive the cable, gripping blocks in said recesses, plungers attached to the blocks and projecting above the carriage and means to normally hold the gripping blocks out of engagement with the cable.

In testimony whereof I have signed my name to this specification in the presence of two subscribing witnesses.

WILLIAM D. SEAL.

Witnesses:
   CHAS. S. FITZ,
   E. W. FITZ.

---

Copies of this patent may be obtained for five cents each, by addressing the "Commissioner of Patents, Washington, D. C."